(12) United States Patent
Camlica

(10) Patent No.: US 12,312,972 B2
(45) Date of Patent: May 27, 2025

(54) EXHAUST MOUNTING MECHANISM

(71) Applicant: TUSAS-TURK HAVACILIK VE UZAY SANAYII ANONIM SIRKETI, Kahramankazan/Ankara (TR)

(72) Inventor: Fahri Bugra Camlica, Kahramankazan/Ankara (TR)

(73) Assignee: TUSAS-TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 0 days.

(21) Appl. No.: 18/569,417

(22) PCT Filed: Jun. 21, 2022

(86) PCT No.: PCT/TR2022/050624
§ 371 (c)(1),
(2) Date: Dec. 12, 2023

(87) PCT Pub. No.: WO2023/277848
PCT Pub. Date: Jan. 5, 2023

(65) Prior Publication Data
US 2024/0262525 A1 Aug. 8, 2024

(30) Foreign Application Priority Data
Jun. 30, 2021 (TR) .............................. 2021/010692

(51) Int. Cl.
F01D 25/30 (2006.01)
(52) U.S. Cl.
CPC .......... F01D 25/30 (2013.01); *F05D 2230/70* (2013.01); *F05D 2260/96* (2013.01)

(58) Field of Classification Search
CPC .......... F01D 25/30; F01D 25/285; B64F 5/10; B64F 5/50; B66F 7/0625; B66F 7/0666
See application file for complete search history.

(56) References Cited

U.S. PATENT DOCUMENTS

| 9,897,011 | B2 | 2/2018 | De Sousa et al. | |
| 10,125,689 | B2 * | 11/2018 | Biffle | F01D 25/285 |
| 12,017,799 | B2 * | 6/2024 | Hotanen | F01D 25/30 |

(Continued)

FOREIGN PATENT DOCUMENTS

WO 2016128642 A1 8/2016

OTHER PUBLICATIONS

International Search Report and Written Opinion for PCT application No. PCT/TR2022/050624, mailed Mar. 24, 2023.
International Application Status Report—generated Nov. 30, 2023.

*Primary Examiner* — J. Todd Newton
(74) *Attorney, Agent, or Firm* — Notaro, Michalos & Zaccaria P.C.

(57) ABSTRACT

An exhaust mounting mechanism for an exhaust part (2) that provides air outlet from an engine provided in air vehicles has a flange (3) in radial form, which is attached to the exhaust part (2) so as to surround an inner wall of the exhaust part (2). A radial extension (4) extends outward from the flange (3), integral with the flange (3) and enabling the exhaust part (2) to be mounted on the engine. A plurality of brackets (5) are located on the flange (3) to extend outward from the flange (3) at distances predetermined by the manufacturer.

15 Claims, 7 Drawing Sheets

(56) References Cited

U.S. PATENT DOCUMENTS

2014/0331667 A1    11/2014   Kindl et al.
2016/0312662 A1*  10/2016   Byrne ........................ F02K 1/04
2018/0128181 A1*   5/2018   Biffle ........................ F02C 7/24

* cited by examiner

EXHAUST MOUNTING MECHANISM

FIELD

The present invention relates to an exhaust mounting mechanism developed to enable the assembly and/or disassembly of an exhaust part in air vehicle engines.

BACKGROUND

At the rear of the air vehicle engines, there is provided the exhaust part for air release, which is formed by a complex assembly process of multiple parts. Exhaust parts of different sizes, designs and diameters for different engine types should be able to be disassembled and assembled without damaging structural parts around them during air vehicle maintenance, engine maintenance or engine production. In order not to damage the exhaust part during disassembly, assembly and transportation, the loads acting thereon due to transportation are calculated during the design and analysis process, and it is strengthened in a way that it will not be damaged due to transportation during manufacturing. Many methods and ground support equipment are being developed to disassemble and reassemble the exhaust part from the air vehicle. Ground support equipment is attached to the exhaust part from its high-strength parts in order not to damage the exhaust part, so that the assembly/disassembly process is performed.

U.S. Pat. No. 9,897,011B1, which is included in the known-state of the art, discloses two exhaust case assemblies provided in turbine engines. Two flanges are used on the exhaust structures and fixing systems are used at the points where the flanges overlap. In addition, recesses and protrusions are provided on the flange, which are spaced longitudinally. The flanges, which are removably engaged to each other, are fixed to each other by means of connectors through the recesses, so that that the two exhaust cases are mounted to each other.

SUMMARY

With an exhaust mounting mechanism according to the present invention, there is no need to attach an extra apparatus to the surface of the exhaust part, and therefore, strength of the structure is increased during design and analysis of the exhaust part. Weight savings are achieved and ground support equipment design is simplified by not using an apparatus attached to the surface of the exhaust part.

The exhaust mounting mechanism realized to achieve the object of the invention, which is defined in the first claim and other claims dependent thereon, comprises a flange having substantially a circular form so as to surround an inner surface of an exhaust part, which is the last portion contacted by hot and/or cold gases coming out of the engine driving military and/or civil air vehicles, wherein the flange is connected to the exhaust part by welding. Thanks to an extension integral with the flange, which extends circularly from the flange outward from the center of the exhaust part, the engine and the exhaust part can be mounted to each other with mechanical connectors. Multiple brackets in the form of protrusions are located on the flange at distances predetermined by the manufacturer.

The exhaust mounting mechanism of the invention comprises a belt which is connected to the brackets by mechanical or welding method by contacting each of the brackets to surround the flange, and remains opposite to the flange when connected. The exhaust part can be attached to the air vehicle engine by means of the belt mounted on all the brackets placed on the flange, which is one of the most durable parts on the exhaust part, and belt-compatible ground support equipment is designed to disassemble the exhaust part from the air vehicle engine, so that assembly and disassembly processes can be carried out without damage during the maintenance and repair of the exhaust part.

In an embodiment of the invention, the exhaust mounting mechanism comprises a plurality of strap elements each forming the belt that consists of many parts to facilitate the assembly of the belt on the brackets.

In an embodiment of the invention, the exhaust mounting mechanism comprises at least a first opening located on the bracket to enable connection of the strap elements on the brackets by mechanical connecting elements such as screws or bolts, wherein the first opening has a thread structure compatible with the mechanical connecting elements. On the strap element, on the other hand, there is at least a second opening of suitable size for the mechanical connecting element to pass through. The first opening and the second opening are overlapped to be aligned with each other, so that the operator passes the mechanical connecting elements therethrough to mount the bracket and strap element.

In an embodiment of the invention, the exhaust mounting mechanism comprises strap elements which can rotate independently of each other by means of at least one joint provided on each of the strap elements. The unfixed end of the strap element, one end of which is fixed on the bracket, is rotated by the operator through the joint such that it moves away from the exhaust part, making it easier for the operator to access the exhaust part for maintenance and repair.

In an embodiment of the invention, the exhaust mounting mechanism comprises the belt which surrounds the flange. Thanks to the second openings provided on both ends of the strap element, with one end on a bracket and the other end on another bracket at a predetermined distance such that it is passed over the brackets placed at distances determined according to the strength analysis of the flange and the exhaust part, a belt structure is provided by mounting the strap element to the brackets, wherein the belt structure faces the flange so that it provides assembly and disassembly of the exhaust part. While forming the belt structure facing the flange, since each strap element is mounted on two brackets with a distance therebetween, two second openings are mounted on each bracket.

In an embodiment of the invention, the exhaust mounting mechanism comprises two brackets fixed adjacently on the flange; and the strap element fixed with one end to one of the adjacent brackets and the other end to the other non-adjacent bracket. Therefore, it is ensured that the belt structure formed by the strap elements does not overlap on any bracket.

In an embodiment of the invention, the exhaust mounting mechanism comprises the lockable joint between each strap element, which enables each strap element to be attached to each other in a position in which the second opening located substantially at the center of the strap element and the first opening on the bracket are overlapped to be fixed. When the operator wants to access the exhaust part, the bracket and the strap element in that area are detached from each other. The two strap elements are detached from each other by unlocking the joint. The operator's access to the exhaust part is provided by the strap element, which is rotated by the operator around the joint provided at the other end of the strap element, so that the strap element is unwrapped.

In an embodiment of the invention, the exhaust mounting mechanism comprises the first strap element and the second strap element, wherein the first strap element remains on one side of the bracket and the second strap element remains on the other side thereof when in a position in which the second opening located substantially at the center of the strap element and the first element on the bracket are overlapped to be fixed. Thanks to the joints on the first strap element and the second strap element, the first strap element and the second strap element can be rotated by the operator in opposite directions and away from the exhaust part. A locking element is provided between the first strap element and the second strap element for avoiding detachment from each other in a non-rotating position and when the ground support equipment is connected.

In an embodiment of the invention, the exhaust mounting mechanism comprises at least one support bar located on the flange such that when the strap element, the first strap element, and the second strap element are each rotated by the operator through the joint, the support bar enables the strap element, the first strap element, and the second strap element to be removably fixed in the position away from the exhaust part for a user-specified period of time in order for the operator to perform maintenance and repair processes.

In an embodiment of the invention, the exhaust mounting mechanism comprises the support bar located on the flange, which is extended telescopically by the operator. Since the support bar can be extended, it is ensured that the strap element, the first strap element and the second strap element remain in the fixed position in a removable manner for a user-specified period of time, away from the exhaust part.

In an embodiment of the invention, the exhaust mounting mechanism comprises a top surface for each bracket, which is the furthest surface of the bracket not in contact with the flange when the bracket is placed on the flange, the top surface being substantially parallel to the flange. There is provided a belt or strap elements forming the belt, which is passed through the top surfaces of the brackets to surround the brackets facing the flange.

In an embodiment of the invention, the exhaust mounting mechanism comprises the belt and the strap element which are made of titanium material with a high strength. Therefore, separation in the belt or strap element is prevented, which would otherwise may cause damage to the exhaust part during transportation.

In an embodiment of the invention, the exhaust mounting mechanism comprises a circular mounting element having an almost L-shaped side view, with the extension extending outward from the flange nearly perpendicular to the flange.

In an embodiment of the invention, the exhaust mounting mechanism comprises the brackets, which ensure equal distribution of the load during transportation as they are placed on the flange at equal distances, regardless of the number.

In an embodiment of the invention, the exhaust mounting mechanism comprises the bracket that can be fixed on the flange mechanically or by welding and can be removed if desired.

In an embodiment of the invention, the exhaust mounting mechanism comprises a plurality of brackets which are attached on the flange and located approximately perpendicular to the extension as protrusions on the flange.

BRIEF DESCRIPTION OF THE DRAWINGS

The exhaust mounting mechanism realized to achieve the object of the present invention is illustrated in the attached drawings, in which.

Figure 1:
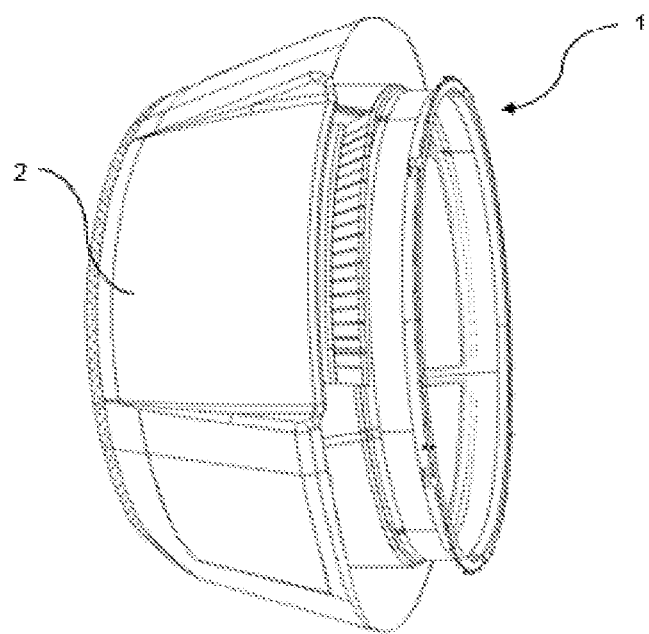
FIG. 1—is a perspective view of the exhaust part.

All the parts illustrated in figures are individually assigned a reference numeral and the corresponding terms of these numbers are listed below:

1. Exhaust Mounting Mechanism
2. Exhaust Part
3. Flange
4. Extension
5. Bracket
   501. Top Surface
6. Belt
7. Strap Element
   701. First Strap Element
   702. Second Strap Element
8. First Opening
9. Second Opening
10. Connecting element
11. Joint
12. Locking Element
13. Support Bar
14. Mounting Element
(E) Ground Support Equipment

DETAILED DESCRIPTION

The exhaust mounting mechanism (1) comprises an exhaust part (2) that provides air outlet from an engine provided in air vehicles; a flange (3) in radial form, which is attached to the exhaust part (2) so as to surround an inner wall of the exhaust part (2); a radial extension (4) extending outward from the flange (3), integral with the flange (3) and enabling the exhaust part (2) to be mounted on the engine; a plurality of brackets (5) which are located on the flange (3) to extend outward from the flange (3), at distances predetermined by the manufacturer.

The exhaust mounting mechanism (1) of the invention comprises a belt (6) mounted on the brackets (5) such that it contacts each bracket (5), remains opposite to the flange (3) and surrounds the flange (3), wherein the belt (6) enables the exhaust part (2) to be grasped and/or carried by a ground support equipment (E) to provide assembly/disassembly of the exhaust part (2) and the engine to/from each other.

Air vehicles have an exhaust part (2), through which hot and/or cold gases from the engine that provides the movement are released. In order to be able to mount the exhaust part (2) and the engine together, a flange (3) surrounding the part of the exhaust part (2) connected with the engine from the inside is connected to the exhaust part (2) by welding method. The exhaust part (2) and the engine are mounted by attaching the engine, by means of mechanical fasteners, to an extension (4) that extends outward from the flange (3), integral with the flange (3), and has a circular form. A plurality of brackets (5) is located on the flange (3) in the form of protrusions. These brackets (5) are placed on the flange (3) according to a load analysis that the flange (3) must carry, which the manufacturer determines (FIG. 1).

Figure 2:
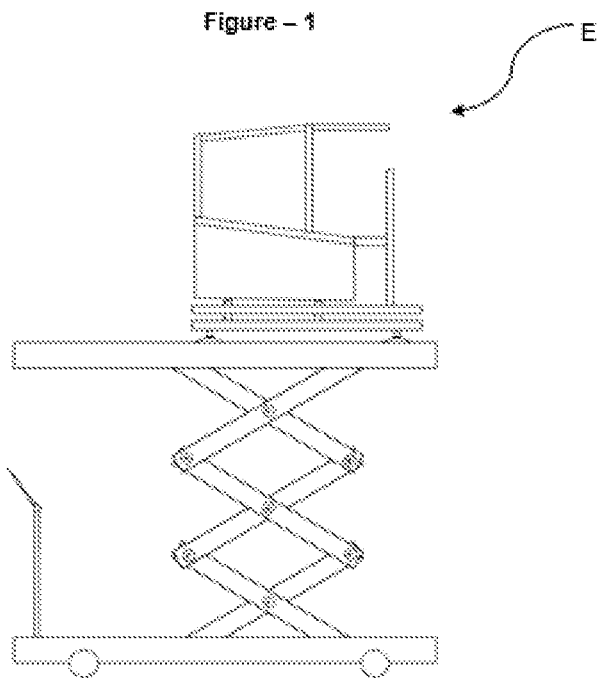
FIG. 2—is a side view of the ground support equipment.
Figure 4:
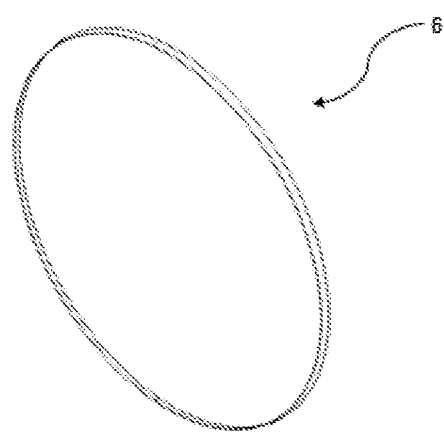
FIG. 4—is a perspective view of the belt.

Thanks to a belt (6), which is positioned opposite the flange (3) to be contacted with each bracket (5) on the flange (3), and which is mounted to the brackets (5) to surround the flange (3), it is enabled that the exhaust part (2) is transported without damage while attaching or removing the exhaust part (2) to/from the engine. The ground support equipment (E) is designed to be suitable for grasping the belt (6) mounted on the brackets (5), and the assembly, disassembly and transportation of the exhaust part (2) is ensured by the belt (6) grasped by the ground support equipment (E) (FIG. 2, FIG. 4).

In an embodiment of the invention, the exhaust mounting mechanism (1) comprises a plurality of strap elements (7) which are each part of the belt (6) mounted on the bracket (5), the belt (6) consisting of a plurality of parts. The belt (6) consists of a plurality of parts, each of which is called a strap element (7), in order to facilitate the mounting process while mounting the belt (6) on the brackets (5) such that it remains opposite to the flange (3).

Figure 7:
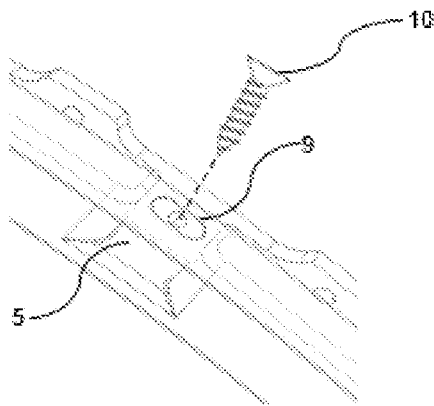
FIG. 7—is a perspective view of the bracket and connecting element.

In an embodiment of the invention, the exhaust mounting mechanism (1) comprises at least a first opening (8) located on the bracket (5), which has a thread structure form-fitting with screws or bolts; at least a second opening (9) located on the strap element (7) such that the screw or bolt can pass therethrough; at least one connecting element (10) in the form of screws or bolts, which is passed through the first opening (8) and the second opening (9) by the operator, so that the bracket (5) and the strap element (7) are mounted to each other. Thanks to the connecting element (10) passed by the operator through at least a first opening (8) located on the bracket (5) and at least a second opening (9) located on the strap element (7), the bracket (5) and the strap element (7) can be fixed to each other in a removable way. The first opening (8) is suitable for the thread structure of the connecting element (10), either screw or bolt, while the second opening (9) is of suitable size for passing the connecting element (10), either screw or bolt, therethrough (FIG. 7).

In an embodiment of the invention, the exhaust mounting mechanism (1) comprises the strap element (7), one end of which is fixed on the bracket (5) and the other end thereof is rotated by the operator to move away from the exhaust part (2); at least one joint (11) located on each strap element (7), allowing each strap element (7) to rotate independently of each other. Thanks to at least one joint (11) provided on each strap element (7) in order to assist the operator to access the exhaust part (2) while maintaining and repairing the exhaust part (2), the strap element (7) fixed to the bracket (5) at one point can be rotated at least one end by the operator such that it moves away from the exhaust part (2).

Figure 8:
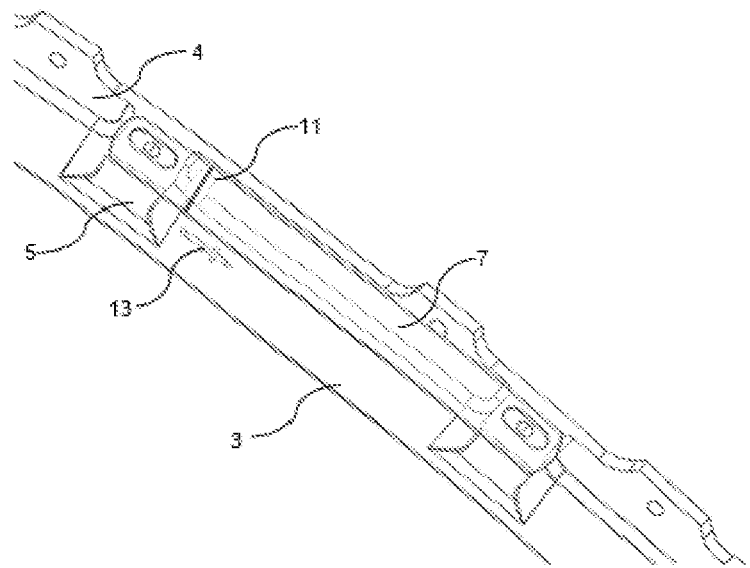
FIG. 8—is a perspective view of the bracket, the strap element and the support bar.
Figure 9:
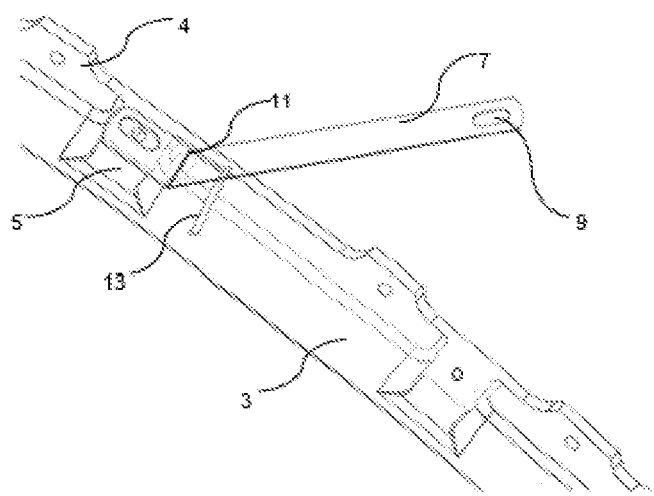
FIG. 9—is a perspective view of the bracket, the strap element and the support bar.

In an embodiment of the invention, the exhaust mounting mechanism (1) comprises two consecutive brackets (5), wherein a distance determined by the manufacturer is provided between each of the brackets (5); the belt (6) which has a second opening (9) at both ends so that a strap element (7) is fixed on two consecutive brackets (5) wherein the belt (6) consists of a plurality of strap elements (7), thereby surrounding the flange (3). The brackets (5), with the distance therebetween determined by the user according to the load carrying capacity by the manufacturer, are fixed on the flange (3). The strap elements (7) to be placed for the transport of the exhaust part (2) are fixed to the brackets (5), which have a distance therebetween, by means of the second opening (9) provided at both ends thereof, so that the belt (6) structure is formed to surround the flange (3) by means of the strap elements (7). The ends of the consecutive strap elements (7) having the second openings (9) coincide on the brackets (5) in this connection arrangement (FIG. 8, FIG. 9).

Figure 10:
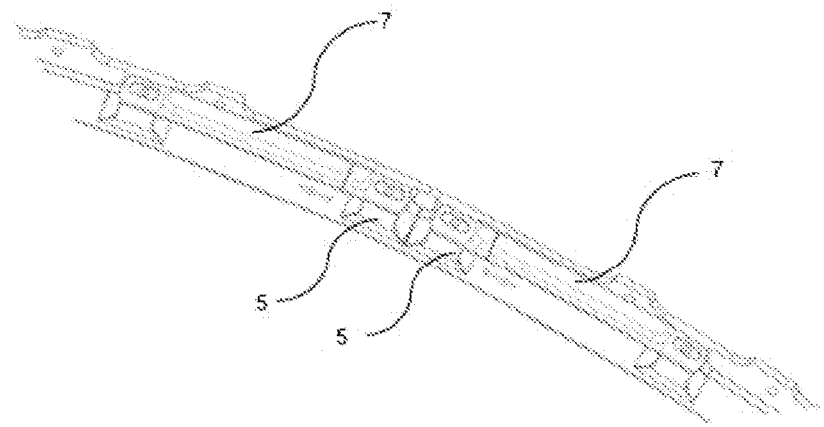
FIG. 10—is a perspective view of the bracket and the strap element.
Figure 11:
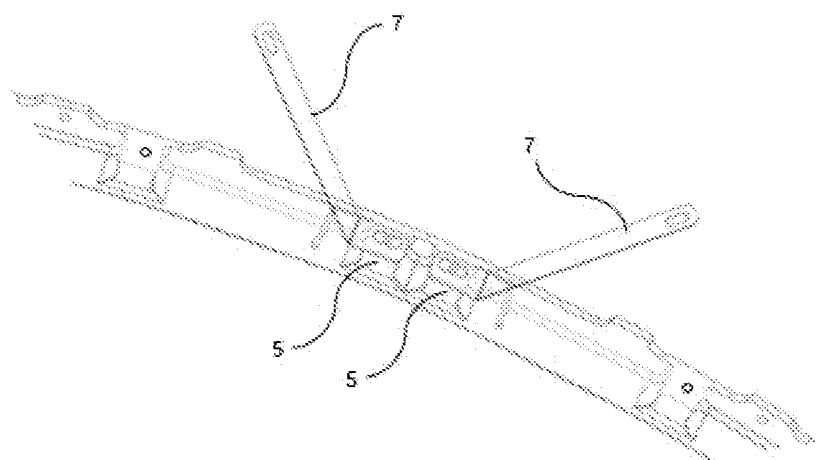
FIG. 11—is a perspective view of the bracket and the strap element.

In an embodiment of the invention, the exhaust mounting mechanism (1) comprises two brackets (5) located substantially adjacent on the flange (3); the belt (6) having a second opening (9) at both ends so that a strap element (7) is fixed on both non-adjacent brackets (5), wherein the belt (6) consists of a plurality of strap elements (7), thereby surrounding the flange (3). The other pair of adjacent brackets (5), which are placed with a distance determined by the manufacturer based on the two adjacent brackets (5), is fixed on the flange (3). When the belt (6) structure is formed by mounting the strap element (7) on two non-adjacent brackets (5) by the operator through the second opening (9) at both ends, the consecutive strap elements (7) are prevent from coinciding at their end portions (FIG. 10, FIG. 11).

Figure 12:
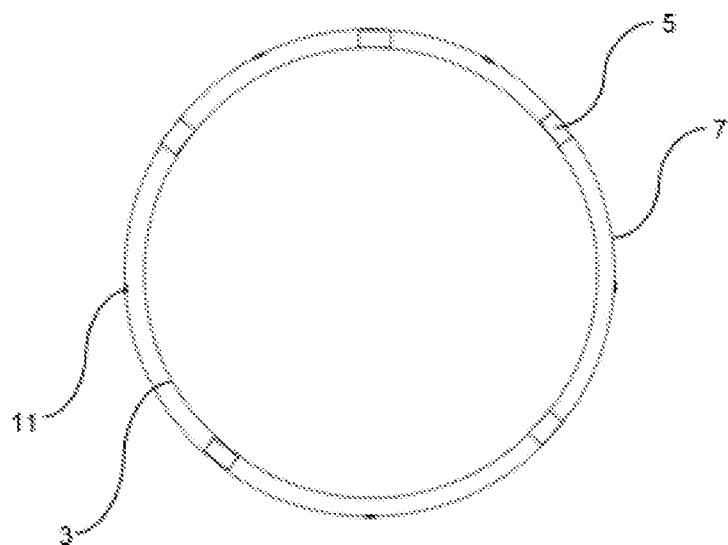
FIG. 12—is a front view of the strap element and the locking element.
Figure 13:
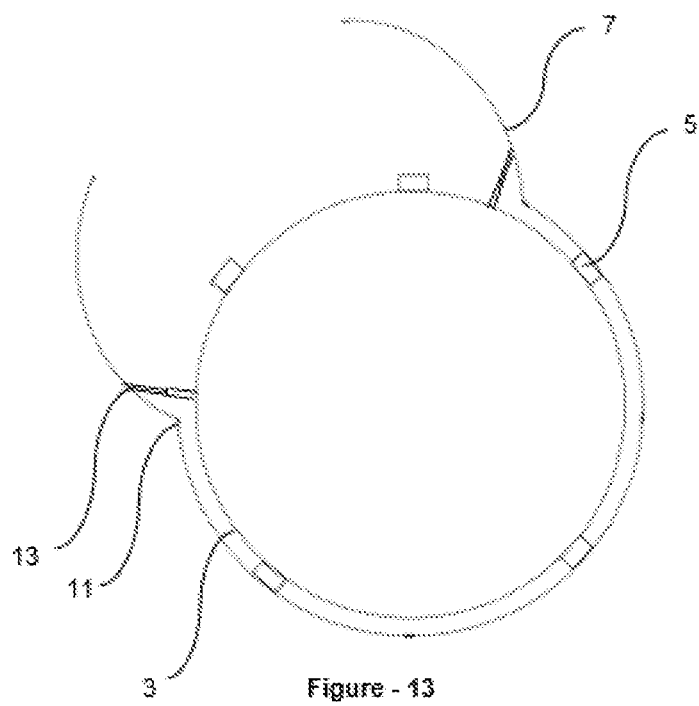
FIG. 13—is a front view of the strap element and the locking element.

In an embodiment of the invention, the exhaust mounting mechanism (1) comprises the second opening (9) located substantially in the middle of the strap element (7) for mounting the strap element (7) to the bracket (5); the lockable joint (11) which enables each strap element (7) to be attached to each other when the bracket (5) and the second opening (9) are positioned on top of each other. The strap elements (7), which are locked to each other by the lockable joint (11) and fixed on the brackets (5), surround the flange (3) such that they are opposite to the flange (3). The disassembly of the strap element (7), which is located in the area desired to be accessed during the operator's access to the exhaust part (2), from the bracket (5) is provided by the operator. The operator opens the joint (11) between the two strap elements (7) and rotates the strap element (7), which is separated from the bracket (5), around the joint (11) at the other end so that it moves away from the exhaust part (2) (FIG. 12, FIG. 13).

Figure 14:
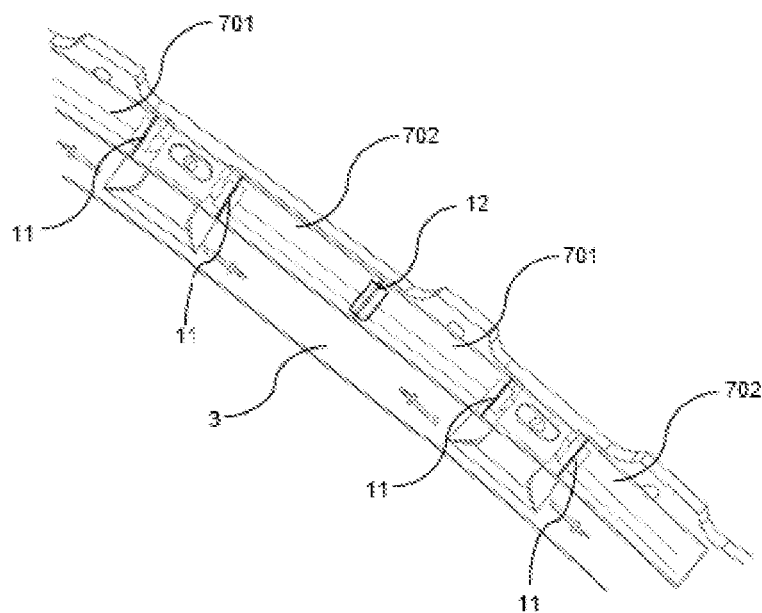
FIG. 14—is a perspective view of the bracket, the first strap element, the second strap element and the joint.
Figure 15:
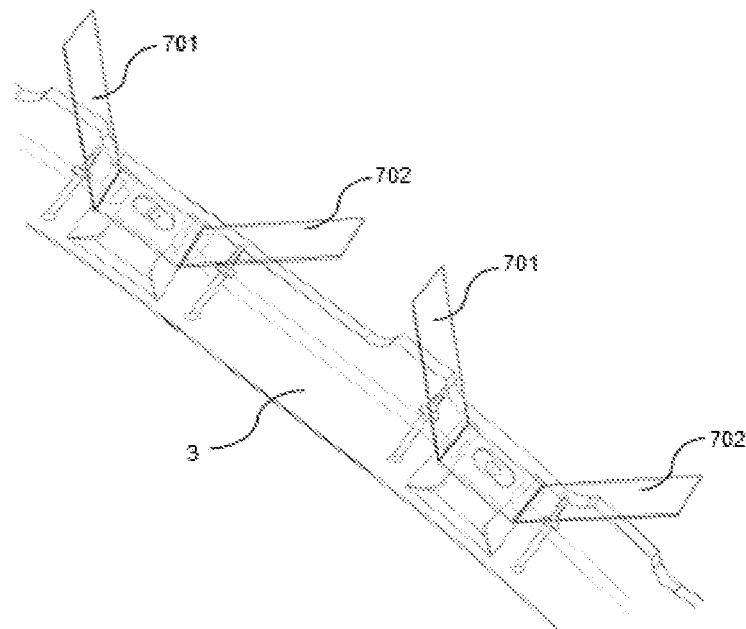
FIG. 15—is a perspective view of the bracket, the first strap element, the second strap element and the joint.

In an embodiment of the invention, the exhaust mounting mechanism (1) comprises the second opening (9) located substantially in the middle of the strap element (7) for mounting the strap element (7) to the bracket (5); a first strap element (701) and a second strap element (702) which are located on each side of the bracket (5) when the bracket (5) and the second opening (9) are positioned on top of each other; the joint (11) located on each first strap element (701) and second strap element (702), which enables the first strap element (701) and the second strap element (702) to move in opposite directions relative to each other and away from the exhaust part (2); at least one locking element (12) which enables each first strap element (701) and second strap element (702) to be attached to each other. The first opening (8) located on the bracket (5) and the second opening (9) located in the middle of the strap element (7) are centred, so that the bracket (5) and the strap element (7) are fixed to each other. Thanks to the joint (11) on the first strap element (701) on one side of the bracket (5) and the joint (11) on the second strap element (702) on the other side thereof, during the maintenance and repair of the exhaust part (2), the first strap element (701) and the second strap element (702) can be rotated by the operator in opposite directions and away from the exhaust part (2). The first strap element (701) and the second strap element (702) are interlocked by the locking element (12), and when the ground support equipment (E) is connected to the first strap element (701) and the second strap element (702), their separation from each other is prevented by the locking element (12) (FIG. 14, FIG. 15).

In an embodiment of the invention, the exhaust mounting mechanism (1) comprises at least one support bar (13) located on the flange (3), which enables the strap element (7) to be fixed when the strap element (7) is rotated around the joint (11) by the operator to move away from the exhaust part (2). There is provided the support bar (13), which is located on the flange (3) and used to keep the end of the strap element (7) in the remote position when at least one end thereof is rotated by the operator around the joint (11) to move away from the exhaust part (2) during the maintenance and repair of the exhaust part (2).

Figure 6:
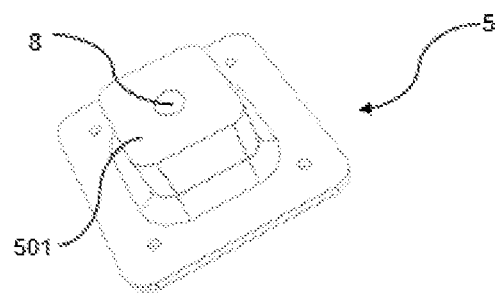
FIG. 6—is a perspective view of the bracket.

In an embodiment of the invention, the exhaust mounting mechanism (1) comprises a top surface (501) of the bracket (5), which is the surface of the bracket (5) furthest from the flange (3); the belt (6) which is passed over each top surface (501) to surround the flange (3). When the bracket (5) is mounted to the flange (3), the top surface (501) of the bracket (5), which is the furthest surface from the flange (3) and is almost form-fitting with the flange (3), ensures the mounting of the strap elements (7). The strap elements (7) are passed over the top surface (501) of each bracket (5) and form the belt (6) structure that surrounds the flange (3) (FIG. 6).

In an embodiment of the invention, the exhaust mounting mechanism (1) comprises the strap element (7) and the belt (6), which are made of titanium, so that they are prevented from breaking during assembly or disassembly of the exhaust part (2). During transportation of the exhaust part (2), thanks to the strap element (7) and belt (6) made of titanium having a high strength, it is ensured that they have high resistance to the loads they are exposed to during transportation. During transportation of the exhaust part (2), the damage caused by the strap element (7) and the belt (6) being broken off or separated, is prevented.

Figure 3:
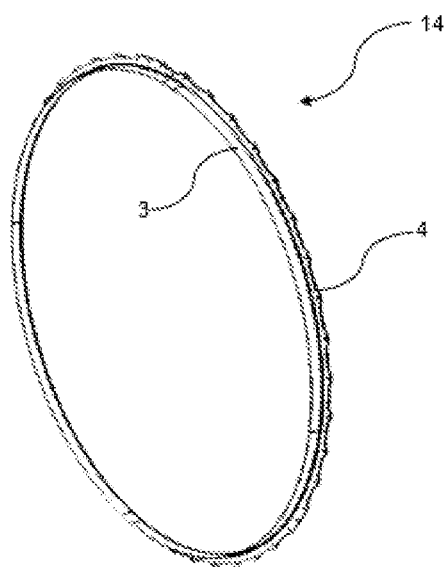
FIG. 3—is a perspective view of the mounting element.
Figure 5:
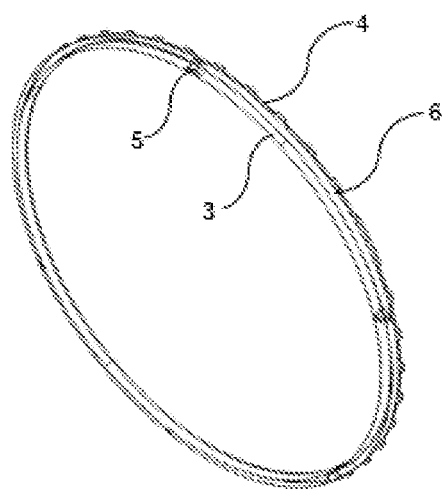
FIG. 5—is a perspective view of the flange, the extension, the connecting element and the belt.

In an embodiment of the invention, the exhaust mounting mechanism (1) comprises a mounting element (14) having an L-shaped circular form, which is formed by combining the flange (3) and the extension (4). The extension (4) extending from the flange (3) outwardly from the center of the exhaust part (2) is almost perpendicular to the flange (3). Therefore, the flange (3) and the extension (4) form the circular L-shaped mounting element (14) (FIG. 3, FIG. 5).

In an embodiment of the invention, the exhaust mounting mechanism (1) comprises a plurality of brackets (5) equally spaced on the flange (3). According to the load analysis performed by the manufacturer on the flange (3), the brackets (5) are arranged at equal distances to prevent the exhaust part (2) from being damaged during assembly and disassembly.

In an embodiment of the invention, the exhaust mounting mechanism (1) comprises the bracket (5), which is removably attached on the flange (3). Thanks to the brackets (5) that can be attached and removed to/from the flange (3) by mechanical connecting elements (10), convenience is provided in the production process of the flange (3) produced by machining.

In an embodiment of the invention, the exhaust mounting mechanism (1) comprises the bracket (5) projecting approximately perpendicular to extension (4). A plurality of brackets (5) protrude on the flange (3) and are located almost perpendicular to the extension (4).

The invention claimed is:

1. An exhaust mounting mechanism (1) comprising:
   an exhaust part (2) that provides air outlet from an engine provided in air vehicles;
   a flange (3) in radial form, which is attached to the exhaust part (2) so as to surround an inner wall of the exhaust part (2);
   a radial extension (4) extending outward from the flange (3), integral with the flange (3) and enabling the exhaust part (2) to be mounted on the engine;
   a plurality of brackets (5) which are located on the flange (3) to extend outward from the flange (3) at predetermined distances; and
   a belt (6) mounted on the plurality of brackets (5) such that the belt (6) contacts each bracket (5) of the plurality of brackets (5), remains opposite to the flange (3) and surrounds the flange (3), wherein the belt (6) enables the exhaust part (2) to be grasped and/or carried by a ground support equipment (E) to provide assembly/disassembly of the exhaust part (2) and the engine to/from each other.

2. An exhaust mounting mechanism (1) according to claim 1, comprising a plurality of strap elements (7), which are each part of the belt (6) mounted on the bracket (5), the belt (6) consisting of a plurality of parts.

3. An exhaust mounting mechanism (1) according to claim 2, comprising:
   at least a first opening (8) located on each of the plurality of brackets (5), which has a thread structure form-fitting with screws or bolts; and at least a second opening (9) located on each of the plurality of strap elements (7) such that the screw or bolt can pass therethrough; and
   at least one connecting element (10) in the form of screws or bolts, which is passed through the first opening (8) and the second opening (9) by an operator, so that each of the plurality of brackets (5) and an associated one of the plurality of strap elements (7) are mounted to each other.

4. An exhaust mounting mechanism (1) according to claim 2, wherein each of the plurality of strap elements (7) has one end fixed on an associated one of the plurality of brackets (5) and another end rotated by an operator to move away from the exhaust part (2); and comprising at least one joint (11) located on each of the plurality of strap elements (7), allowing each strap element (7) to rotate independently of each other.

5. An exhaust mounting mechanism (1) according to claim 3, wherein two of the plurality of brackets (5) are consecutive; wherein a predetermined distance is provided between each of the brackets (5); wherein the belt (6) has a second opening (9) at both ends so that one of the plurality of strap elements (7) is fixed on two consecutive brackets among the plurality of brackets (5); and wherein the plurality of strap elements (7) surround the flange (3).

6. An exhaust mounting mechanism (1) according to claim 3, wherein two of the plurality of brackets (5) are located substantially adjacent on the flange (3); wherein the belt (6) has a second opening (9) at both ends so that one of the plurality of strap elements (7) is fixed on both non-adjacent brackets (5); and wherein the plurality of strap elements (7) surround the flange (3).

7. An exhaust mounting mechanism (1) according to claim 3, wherein the second opening (9) is located substantially in the middle of each of the plurality of strap elements (7) for mounting each strap element (7) to the bracket (5); and comprising a lockable joint (11) that enables each strap element (7) to be attached to each other strap element (7) when the bracket (5) and the second opening (9) are positioned on top of each other.

8. An exhaust mounting mechanism (1) according to claim 3, wherein the second opening (9) is located substantially in the middle of each of the plurality of strap elements (7) for mounting each strap element (7) to an associated one of the plurality of brackets (5); comprising:
- a first strap element (701) and a second strap element (702) located on each side of the associated bracket (5) when the associated bracket (5) and the second opening (9) are positioned on top of each other;
- a joint (11) located on each first strap element (701) and second strap element (702), which enables the first strap element (701) and the second strap element (702) to move in opposite directions relative to each other and away from the exhaust part (2); and
- at least one locking element (12) which enables each first strap element (701) and second strap element (702) to be attached to each other.

9. An exhaust mounting mechanism (1) according to claim 4, comprising at least one support bar (13) located on the flange (3), which enables each of the plurality of strap elements (7) to be fixed when rotated around the joint (11) by the operator to move away from the exhaust part (2).

10. An exhaust mounting mechanism (1) according to claim 1, comprising a top surface (501) of each of the plurality of brackets (5), which is a surface of each bracket (5) furthest from the flange (3); and wherein the belt (6) is passed over each top surface (501) to surround the flange (3).

11. An exhaust mounting mechanism (1) according to claim 2, wherein each of the plurality of strap elements (7) and the belt (6) are made of titanium.

12. An exhaust mounting mechanism (1) according to claim 1, comprising a mounting element (14) having an L-shaped circular form, which is formed by combining the flange (3) and the extension (4).

13. An exhaust mounting mechanism (1 according to claim 1, wherein the plurality of brackets (5) are equally spaced on the flange (3).

14. An exhaust mounting mechanism (1) according to claim 1, wherein each of the plurality of brackets (5) is removably attached on the flange (3).

15. An exhaust mounting mechanism (1) according to claim 1, wherein each of the plurality of brackets (5) projects approximately perpendicular to extension (4).

* * * * *